Feb. 18, 1964  R. F. LONCOSKE  3,121,262
SOUND INSULATING STRUCTURE
Filed July 28, 1960  2 Sheets-Sheet 1

INVENTOR.
RICHARD F. LONCOSKE
BY
ATTORNEY

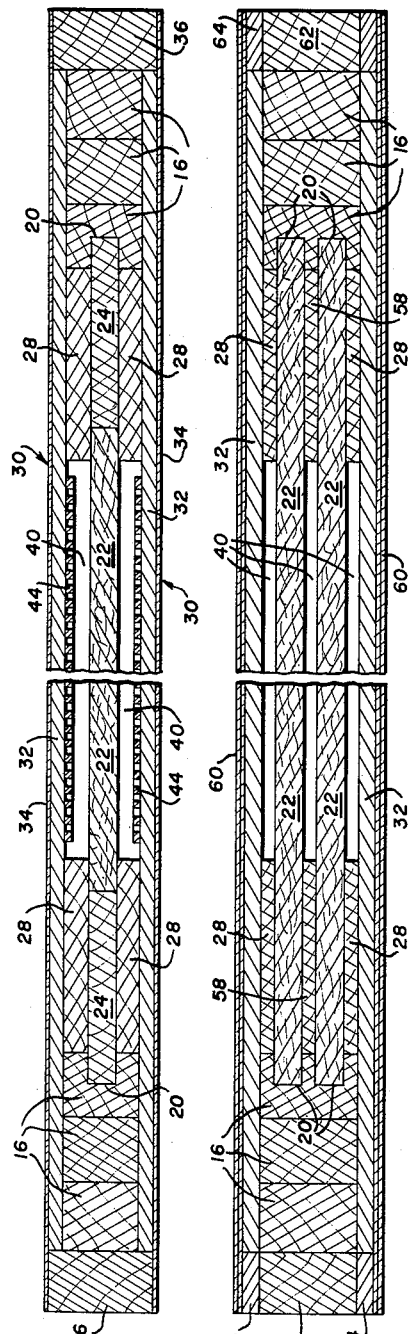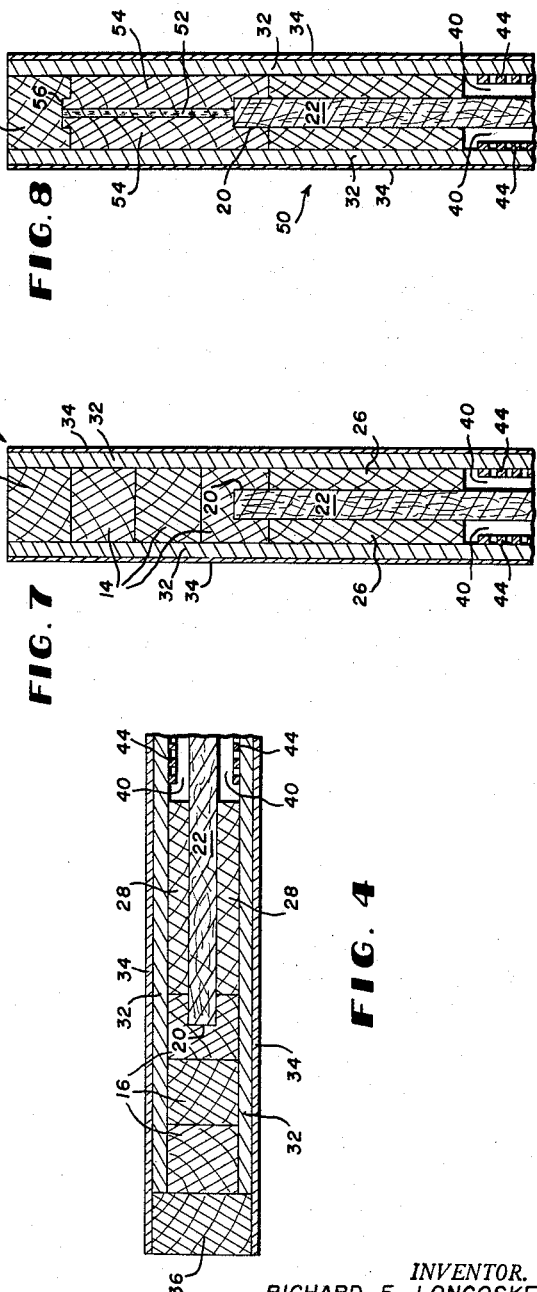

2

3,121,262
SOUND INSULATING STRUCTURE
Richard F. Loncoske, Ridgway, Pa., assignor, by mesne assignments, to Hyde Murphy Company, Ridgway, Pa., a corporation of Pennsylvania
Filed July 28, 1960, Ser. No. 45,822
5 Claims. (Cl. 20—35)

This invention relates generally to a sound insulating structure in the nature of a fixed or movable partition, or the like, and more particularly to a flush door in which a high degree of resistance to sound transmission is gained without resorting to heavy or unsightly constructions, and which, despite nominal thin dimensions and relatively light weight, is nevertheless highly resistant to warping.

It is well known that the transmission of sound by way of structural elements such as doors, windows, partitions and walls results from the forced vibration of such structures induced by the incidence of sound waves on one side. The forced vibration of the structure generates sound waves on the opposite side of the structure. The resistance to sound transmission can be increased by utilizing heavier and stiffer materials in the structure, but this is expensive and aesthetically impractical.

Attempts have been made to reduce sound transmission by constructing hollow doors and partitions which enclose various types of fibrous material such as vegetable and mineral fibers, felt and hair. These have proven to be relatively ineffective because the fibrous materials provide a substantial measure of solid contact between the faces of the hollow doors and thus increases the transmission of vibratory motion between the outer faces over that of hollow doors not so filled, thereby subtracting from the value of the fibrous material as a damping agent.

Another means that has been hitherto employed involves the use of a hollow core structure and a maze of partitions to circulate air within the structure. This type of construction has some damping effect, but is not fully effective by reason of sound transmission through the relatively large frame separating the outer faces. Furthermore, the lack of a solid core renders the structure easily susceptible to warping.

Yet another sound resistant door which has been proposed utilizes a heavy frame in which one or more hollow metal or wood panels are inserted and held by means of rubber grommets. This construction is inefficient in that air sealed in the hollow panels conducts considerable vibration between the outer faces, and also the frame is highly conductive of sound. Furthermore, the structure is not warp free, and the rubber grommets form discontinuities in the outer surfaces which detract from the appearance and are less pleasing to the eye than a fully flush door.

It is a primary object of the present invention to provide a sound insulating structure which obviates the defects and deficiencies outlined above with respect to conventional structures.

Another object of the invention is to provide a soundproof structure which embodies a frame of small area to reduce wave transmission, a soft damper sheet floatingly supported in the frame, and vented planar air chambers surrounding the damper sheet to further reduce the transmission of sound between outer faces covering the frame.

A further object of the invention is to provide a soundproof structure of the character described above in which is included a second small area frame which is seated within the first frame but secured only to the damper sheet to minimize sound transmission, and so arranged as to reinforce the outer panels of the structure and prevent warping.

A still further object of the invention is to provide a soundproof structure of the character described above in which foraminous sheets are fastened to the outer panels, such sheets being seated in the air chambers and partially absorbing vibrations as well as stiffening the outer door panels.

Yet another object of the invention is to provide a soundproof structure of the character indicated in which the outside frame is divided in a plane parallel to the outer panels and a soft, flexible, sound-isolation pad inserted between the frame parts.

Another object of the invention is to provide a soundproof door of the character indicated wherein the exterior surfaces present a fully continuous, flush and pleasing appearance.

Yet another object of the invention is to provide a soundproof structure of the character indicated which is warp free, compact, similar in size and appearance to a conventional solid core flush door, light in weight and easy to manipulate.

Still another object of the invention is to provide a soundproof structure of the character described which is simple, efficient and economical to construct using conventional tools and facilities.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 3 is an enlarged, horizontal section of the door taken along line 3—3 of FIG. 2;

FIG. 4 is an enlarged fragmentary section taken along line 4—4 of FIG. 2;

FIG. 7 is a fragmentary vertical section taken along line 7—7 of FIG. 2;

FIG. 8 is a fragmentary vertical section corresponding to FIG. 7, but illustrating the construction of a modified door, and FIG. 9 is a horizontal section corresponding to FIG.

Figure 1:
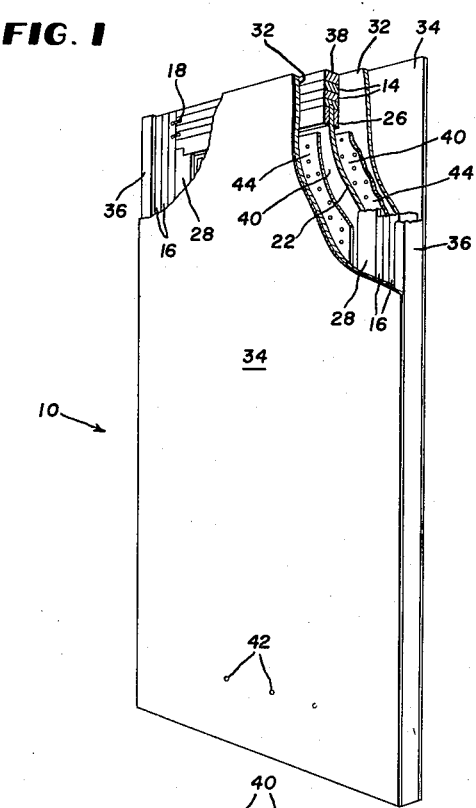
FIG. 1 is a perspective view of a sound insulating structure in the form of a flush door which has been constructed in accordance with the principles of the invention and which has parts thereof broken away to better illustrate the internal construction features.

3 showing the construction of another modified door which embodies a pair of soft damper boards.

Referring now to the drawings, and particularly to FIGS. 1–7, the invention is illustrated therein as incorporated in the structure of an improved warp-free, flush type, sound insulating door 10 which comprises a covered outer, circumferential frame 12 formed of horizontally disposed rails 14 and vertically disposed stiles 16. The frame 12 is intentionally made as narrow as possible to reduce the area for direct transmission of sound waves through the door.

To preserve rigidity and prevent warping, both the rails and stiles preferably are laminated, three layers being shown, the layers being formed by ripping appropriate lengths from narrow strips of wood which lengths are then glued together with the center, or alternate ones, reversed so as to cross the grain. Obviously, one piece clear straight grained lumber may be used for the stiles and rails in lieu of the laminated structure but the use of such lumber is usually not economically feasible. At the corners of the frame, the rails and stiles are drilled to tightly receive fastening means which preferably may take the form of wood dumbbell blocks 18 driven into the openings to lock the frame elements together, or conventional dowels may be used in lieu of the blocks 18.

The inner peripheral surfaces of frame 12 are centrally grooved at 20 to freely or floatingly receive a damper sheet 22 of homasote board or other suitable soft material capable of absorbing sound waves. At the sides of the door, lock blocks 24 are inserted into groove 20 and secured to the frame by glue or other suitable means. The damper sheet 22 is cut out to fit around the lock blocks and is not fastened thereto. The lock blocks provide strengthened sections for securement of locks, handles and associated hardware.

Figure 2:
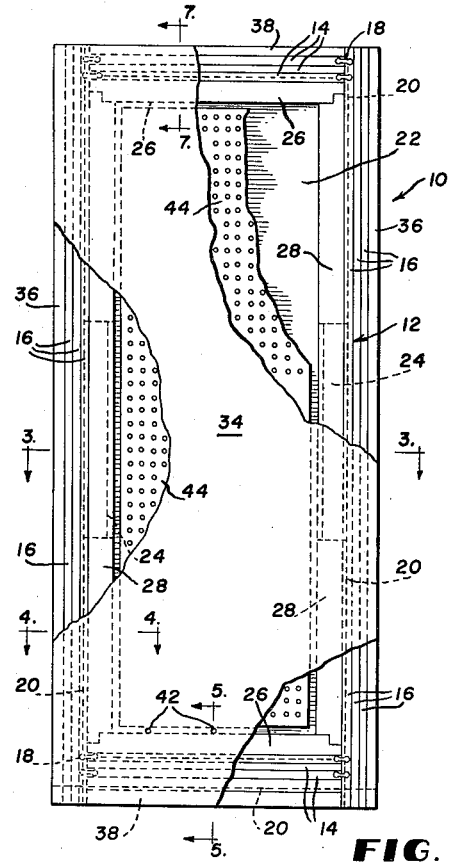
FIG. 2 is a side elevational view of the door shown in FIG. 1, and having parts of the outer panel broken away to reveal interior structure.
Figure 5:
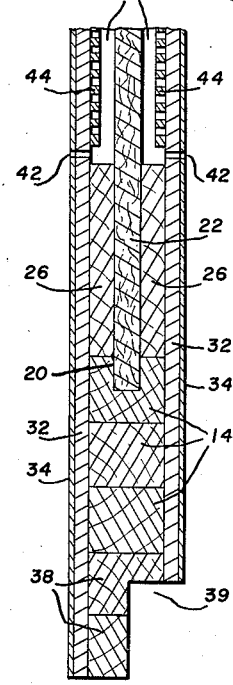
FIG. 5 is an enlarged fragmentary vertical section taken along line 5—5 of FIG. 2.
Figure 6:
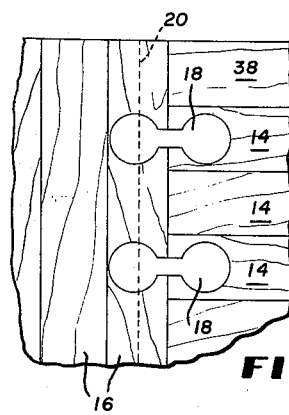
FIG. 6 is a fragmentary enlarged plan view showing the means for securing and locking the corners of the door frame.

The soft damper sheet is preferably framed on both sides by horizontal and vertical stiffener elements 26 and 28. These stiffener elements preferably are notched at their ends so as to interfit at the corners, as shown in FIGS. 1 and 2, so that they mutually cooperate to retain themselves in position within the confines of the surrounding frame 12. By this arrangement, the stiffeners need not be fixed either to each other, the damper sheet or the adjacent outer panel 30. However the stiffener elements may be glued or otherwise secured only to the damper sheet 22 and thus form an inner rectangular frame which floats with the damper sheet inside the periphery of outer frame 12. Finally the stiffener elements may be glued or otherwise secured to the adjacent outer panels 30 whether or not they are attached to the damper sheet 22. The inner frame, narrow as it is illustrated, not only stiffens the soft damper, but being in contact with the inner faces of the outer door panels, as will hereinafter more clearly appear, also tends to reinforce the latter and prevent warpage.

The outer panels 30 are each preferably formed of sheets 32 and a face veneer 34. The sheets 32 are each preferably formed of plywood or equivalent such as a board made from chips of wood and glue and usually referred to as particle board or hardboard. These panels are glued or otherwise fastened only to the outer frame 12, covering the frame to provide continuous, or flush, outer faces of pleasing appearance. The vertical edges of the door are covered by facing strips 36 of the same species of lumber as the face veneer and glued to the stiles. One or more hardwood strips 38 are similarly glued to the upper and lower rails inside the panels 30. A drop seal recess 39 may be formed in the bottom rail for seating conventional stop and seal elements, not shown. The recess 39 may be in the form of a groove opening through the bottom edge only of the door so that the drop seal is concealed from view.

A pair of air chambers 40 are formed inside the inner frame elements 26, 28 and between the damper board 22 and each outer panel 30. The air chambers lower the weight of the door and reduce the transmission of sound waves from one side to the other. To prevent alternate contraction and expansion of air trapped in the chambers 40 by sound vibrations, each chamber is preferably vented as by a plurality of minute openings 42 drilled through the outer panels. These openings are so small as to be barely noticeable and therefore do not detract from the appearance of the door. With these openings, however, a large part of the sound vibration energy is used merely to alternately push and pull air from and into chambers 40 thus lessening the conduction of the sound waves to the damper board.

The door may be further rigidified against warping by inclusion of stiffener plates 44 secured by glue or other means to the inside surfaces of the outer panels 30, and positioned within the air chambers 40 in such a way as to leave space for air between the stiffeners and the damper board and its frame elements 26, 28. Desirably, the plates 44 are formed of pegboard or similar hard, foraminous material. The multiplicity of openings of the pegboard lighten the door and, by reason of the air in each opening, tend to absorb or cushion sound waves, thus further reducing sound transmission from one door face to the other.

A flush door constructed as described above will be extremely light because of the planar air chambers, the porous damper sheet and the perforations in the pegboard stiffeners 44. Nevertheless, the door will be highly resistant to warping because of the rigidity contributed to the outer panels 30 by the stiffeners 44 and the inner frame members 26 and 28 which bear against the inside surfaces of the panels.

When a sound wave strikes the face veneer of one outer panel, it is conducted directly to the other panel only through the narrow frame 12 whose small area considerably reduces such conduction. The sound vibrations at the entering face are resisted by the rigid construction of the panel 30 laminated with the pegboard stiffener sheet 44. The resultant wave, greatly attenuated, is then transferred to the adjacent air chamber 40. Since the air chamber is vented by ports 42, the wave is further attenuated because the air in the chamber is permitted to move freely back and forth from the room whence the sound originated rather than to compress and expand as it would in a sealed chamber.

Thus only a small part of the sound wave energy is transferred to the damper board 22. This damper board being soft, porous and sound absorbent tends to absorb the remaining energy of the sound vibrations. What little energy of the sound which is not absorbed by the damper is transferred to the second air chamber. Here again the force of the wave is dissipated by the second set of ports 42 venting to the next room, and the transfer of residual energy of the sound wave is resisted by the second stiff panel 30 reinforced by its pegboard stiffener 44.

A 1¾" thick door, constructed as described above, was tested by an independent laboratory to specification as recommended by the American Society for Testing Materials, ASTM E–90–55. The door, which weighed 4.3 lbs./sq. ft., was found to yield a sound transmission loss of approximately 39.5 decibels. Various conventional sound insulating doors of corresponding thickness are known to be both considerably heavier, approximately 6.5 lbs./sq. ft., and considerably less sound resistant, approximately 38 decibels transmission loss.

The described flush door may be simply and easily fabricated using conventional tools and equipment in the following manner. First, the rails and stiles 14 and 16 are ripped to size, alternate pieces reversed and glued together to form the outer frame elements. Next, the groove 20 is machined, or dadoed, in the stiles and rails. The lock blocks 24 are then positioned in the groove and glued into place. The soft homasote damper sheet 22 is then cut to correct size so as to fit into the dado of the stiles and rails when they are assembled and to snugly fit around the lock blocks.

Openings are then drilled in the stiles and rails to receive the dumbell blocks 18 or standard dowels if the latter are used instead of the blocks 18. Next the stiles and rails are fitted around the damper sheet and the dumbbell blocks or dowels driven into place to secure the frame corners. These wooden fasteners can be used in conjunction with high frequency glue presses, and are therefore more satisfactory than metal fasteners. As used here, the dumbell blocks permit the fastening of stiles, rails and bands without the need of glue and permit easier assembly of inside panels having mortise and tenon joints.

The stiffener members 26, 28 are next interfitted within the frame 12 against the damper board 22 to form the inner frame which may float within the outer frame. The board panels 32 and the pegboard stiffeners 44 are then properly sized and positioned with respect to each other and glued together. These are then glued to the stiles and rails which form the outer frame 12. The edge strips 36 and 38 of appropriate thickness are positioned and glued respectively to the stiles and rails. The face veneer skins 34 are then glued over the board panels 32 in a suitable press. The vent openings 42 are drilled through the faces of the panels 30, completing the door.

The door, fabricated as described, should be used with conventional acoustical rubber stops on jambs, bucks and astrogals. Because of the construction, standard hardware, glazing and drop seals can be used, eliminating need for special devices. If desired certain elements such as the lock blocks 24 and stiffeners 44 may be omitted at some sacrifice of sound insulating and warp free qualities.

In FIG. 8 is illustrated a modified flush door which may be identical with that illustrated in FIGS. 1-7 in all respects except that the outer frame formed of the stiles and rails is divided in a plane parallel to the outer faces 34 and an isolation pad 52 of cork, rubber or other sound absorbing material inserted between the divided parts. As shown in the drawing, the stiles may be formed in two sections 54 separated by the cork pad 52 and secured by mortise and tenon joint 56 to the edge strip 38. It will be understood that a similar construction applies to the rail portion of the frame, not illustrated. With this construction, even the narrow outer frame does not directly conduct sound waves from one face to the other since they are absorbed in the cork pad 52 which extends completely around the door. A 1¾" thick door constructed in this manner weighed slightly less, 4.3 lbs./sq. ft., and yielded considerably more sound transmission loss, 41 decibels, than the door previously described.

In the event that a larger transmission loss is necessary or desirable, the described doors may be made thicker and to include a pair of damper boards as illustrated in FIG. 9. The flush door illustrated in this drawing is in all respects similar to that described and shown in FIGS. 1-7 except as noted hereinafter. The pair of spaced damper boards 22 are secured in recesses 20 in the stile elements 16 as well as in the rail elements, not shown. Three parallel air chambers 40 are thus formed of which the two outer, or all three if desired, may be vented as previously described. An intermediate stiffener section 58 is added to the stiffeners 28 and positioned between the damper boards 22 to complete the inner frame which floats with the dampers. The outer panels each comprises a plywood sheet 32 and a face veneer bonded to a cross band as indicated at 60. The door edges may be finished by edge strips 62 joined at the sides to plywood bands 64. It will be apparent that a door constructed as shown in FIG. 9, while being somewhat thicker and heavier than those previously described, will also be considerably more efficient as a sound insulator.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. In a sound insulating structure, the combination of a circumferential outer frame, at least one peripheral groove in the inner surface of said frame, at least one sheet of porous sound dampening material floatingly received in said groove and extending the full internal width and height of said frame, a pair of flush type face panels each having an uninterrupted outer, planar surface, said panels being secured to and covering said frame, said face panels, frame and sheet of dampening material enclosing at least a pair of unbroken, planar air chambers one on each side of said sheet of dampening material, and means for venting each of said air chambers independently of one another whereby to lessen passage of sound waves from one chamber to the other, said means including small vent openings through each of said face panels.

2. In a sound insulating structure, the combination of a circumferential outer frame, at least one peripheral groove in the inner surface of said frame, at least one sheet of porous sound dampening material floatingly received in said groove and extending the full internal width and height of said frame, a pair of flush type face panels each having an uninterrupted outer, planar surface, said panels being secured to and covering said frame, said face panels, frame and sheet of dampening material enclosing at least a pair of unbroken, planar air chambers one on each side of said sheet of dampening material, and stiffening boards of pegboard or like foraminous material having edges spaced from the circumferential frame and secured to the inner surfaces of said face panels, said stiffening boards extending respectively into said air chambers without touching said sheet of sound dampening material.

3. In a sound insulating structure, the combination of a circumferential outer frame, at least one peripheral groove in the inner surface of said frame, at least one sheet of lightweight, sound dampening material floatingly received in said groove and extending the full internal width and height of said frame, a pair of face panels each having an uninterrupted outer, planar surface, said panels being secured to and covering said frame, said face panels, frame and sheet of dampening material enclosing at least a pair of unbroken planar air chambers one on each side of the sheet of dampening material, and a second circumferential frame fitting within the said frame and secured only to said sheet of dampening material to float therewith, said second frame contacting the inner surfaces of the face panels whereby to stiffen the structure and prevent warpage.

4. In a sound insulating structure, the combination of a circumferential outer frame, at least one peripheral groove in the inner surface of said frame, at least one sheet of lightweight, sound dampening material floatingly received in said groove and extending the full internal width and height of said frame, a pair of face panels having uninterrupted outer, planar surfaces and secured to and covering said frame, said face panels, frame and sheet of dampening material enclosing at least a pair of unbroken, planar air chambers one on each side of the sheet of dampening material, a plurality of small vent opening through each of said face panels communicating with said air chambers, and a stiffening board formed of pegboard or like foraminous material having edges spaced from the circumferential frame and secured to the inner surface of each of said face panels, said stiffening boards extending respectively into said air chambers without touching said sheet of sound dampening material.

5. In a sound insulating structure, the combination of a circumferential outer frame, at least one peripheral groove in the inner surface of said frame, at least one sheet of porous sound dampening material floatingly received in said groove and extending the full internal width and height of said frame, a pair of face panels having uninterrupted outer, planar surfaces and secured to and covering said frame, said face panels, frame and sheet of dampening material enclosing at least a pair of unbroken, planar air chambers one on each side of the sheet of dampening material, a plurality of small vent openings through each of said face panels communicating with said air chambers, a stiffening board formed of pegboard or like foraminous material having edges spaced from the circumferential frame secured to the inside surface of each of said face panels, said stiffening boards extending respectively into said air chambers without touching said sheet of sound dampening material, and a second circumferential frame fitting within the said frame and secured only to said sheet of dampening material to float therewith, said second frame contacting the inner surfaces of the face panels whereby to stiffen the structure and prevent warpage.

References Cited in the file of this patent

UNITED STATES PATENTS

| | | |
|---|---|---|
| 2,079,878 | Sabine | May 11, 1937 |
| 2,178,729 | Shields | Nov. 7, 1939 |
| 2,214,675 | Jensen | Sept. 10, 1940 |
| 2,302,487 | Beiger et al. | Nov. 17, 1942 |
| 2,620,521 | Fleet | Dec. 9, 1952 |

FOREIGN PATENTS

| | | |
|---|---|---|
| 645,505 | France | June 27, 1928 |
| 746,665 | France | Mar. 14, 1933 |
| 106,911 | Sweden | Mar. 23, 1943 |
| 489,518 | Canada | Jan. 13, 1953 |